United States Patent [19]

Eschrich et al.

[11] Patent Number: 4,584,905
[45] Date of Patent: Apr. 29, 1986

[54] METHOD AND APPARATUS FOR CONTROL OF GEAR CHANGING UNDER LOAD IN A TRANSMISSION

[75] Inventors: Gerhard Eschrich, Gerlingen; Alfred Müller, Gröbenzell; Joseph Sauer; Achim Schreiber, both of Schwieberdingen, all of Fed. Rep. of Germany

[73] Assignee: Robert Bosch GmbH, Stuttgart, Fed. Rep. of Germany

[21] Appl. No.: 488,548

[22] PCT Filed: Sep. 7, 1982

[86] PCT No.: PCT/DE82/00182

§ 371 Date: Apr. 11, 1983

§ 102(e) Date: Apr. 11, 1983

[87] PCT Pub. No.: WO83/01042

PCT Pub. Date: Mar. 31, 1983

[30] Foreign Application Priority Data

Sep. 16, 1981 [DE] Fed. Rep. of Germany ....... 3136725

[51] Int. Cl.⁴ .................. B60K 41/04; B60K 41/18
[52] U.S. Cl. ........................................ 74/861; 74/866
[58] Field of Search ............... 74/861, 866, 867, 868, 74/869

[56] References Cited

U.S. PATENT DOCUMENTS

| 3,501,979 | 3/1970 | Forster et al. | 74/869 |
| 3,670,599 | 6/1972 | Nagamatsu | 74/869 |
| 3,703,109 | 11/1972 | Irie et al. | 74/866 |
| 3,748,926 | 7/1973 | Mohri et al. | 74/866 |
| 3,941,016 | 3/1976 | Will | 74/868 |
| 3,942,393 | 3/1976 | Förster | 74/866 |
| 4,222,292 | 9/1980 | Will et al. | 74/861 |
| 4,228,700 | 10/1980 | Espenschied et al. | 74/861 |
| 4,254,671 | 3/1981 | Sauer et al. | 74/866 |
| 4,262,557 | 4/1981 | Grob et al. | 74/861 |
| 4,266,447 | 5/1981 | Heess et al. | 74/866 |
| 4,267,750 | 5/1981 | Espenschied et al. | 74/861 |
| 4,285,252 | 8/1981 | Yamaki et al. | 74/862 |
| 4,318,312 | 3/1982 | Morimoto | 74/861 |

FOREIGN PATENT DOCUMENTS

| 2040918 | 2/1972 | Fed. Rep. of Germany . | |
| 2539285 | 3/1977 | Fed. Rep. of Germany . | |
| 2742033 | 3/1979 | Fed. Rep. of Germany | 74/866 |
| 2066040 | 5/1979 | Fed. Rep. of Germany . | |
| 2931744 | 2/1981 | Fed. Rep. of Germany . | |
| 2938268 | 4/1981 | Fed. Rep. of Germany . | |
| 2139531 | 1/1973 | France . | |

OTHER PUBLICATIONS

Bosch, Automotive Handbook, 1976, p. 321.

Primary Examiner—William F. Pate, III
Assistant Examiner—David Novais
Attorney, Agent, or Firm—Frishauf, Holtz, Goodman & Woodward

[57] ABSTRACT

A method and an apparatus are proposed for control of gear changing under load in a transmission of a vehicle driven by an internal combustion engine. In all gear changing instances, the hydraulic pressure upon the frictionally engaged elements is established with a constant slippage time proportionally to the sum of the engine torque and the product of the engine speed and a constant factor. The constant factor depends on the slippage time and on the gear changing instance (FIG. 1).

9 Claims, 4 Drawing Figures

METHOD AND APPARATUS FOR CONTROL OF GEAR CHANGING UNDER LOAD IN A TRANSMISSION

STATE OF THE ART

The present invention relates generally to the regulation of hydraulic pressure during gear changes in automotive automatic transmissions, and more particularly to an improved method and apparatus for hydraulic pressure regulation which keeps the slippage time constant, regardless of the type of gear change involved, and sets the hydraulic pressure in each instance to a value which is optimum in terms of both equipment wear and passenger comfort.

In known automatic transmissions, gear changes are performed at specific combinations of engine load (gas pedal position) and vehicle speed. In an electronic gear control system, these switching points are programmed in fixed form as characteristic gear changing curves. The frictionally engaged elements such as clutches or brakes, which are released or closed to effect the changing of the gear, are generally actuated hydraulically. The pressure in the frictionally engaged elements, which must be adapted to the engine torque at a given time, must not be excessively low, because then the slippage time, that is, the time during which the parts of the elements which effect the frictional engagement are sliding on one another, becomes too long. There would be excessive wear and heat, which causes the destruction of the frictional elements. On the other hand, the pressure must not be too high, because otherwise passenger comfort suffers from an excessive jolt while changing gears. From German Disclosure Document DE-OS No. 29 31 744, a method and apparatus for control of gear changing under load in a stepped gear transmission are known, in which the actuation force for the elements which function by frictional engagement is established by means of a hydraulic apparatus, which generates four pressure stages. The disadvantage in this known apparatus is that the pressure adaptation is effected only in some operating ranges, so that it may sometimes be inexact.

ADVANTAGES OF THE INVENTION

The method according to the invention and having the hydraulic pressure set proportional to the sum of the engine torque and the product of the engine speed and a constant factor and the apparatus according to the invention and having the adjusting elements, for actuating frictionally engaged elements, the adjusting elements being responsive to the sum of an engine torque signal and a multiple of an engine speed signal have the advantage over the prior art that the correct pressure is established for every gear changing point, and the slippage time remains constant for all the gear changing points. The gear changes are effected optimally in terms of both wear and comfort.

By means of the use of a pair of pressure regulators advantageous further embodiments of and additional improvements to the method and the apparatus are attained. As a result of the specialized embodiment of the stepped slide valve and regulating slide valve, only two pressure regulators are required for actuating all the frictionally engaged elements.

DRAWING

The apparatus according to the invention is shown in the drawing and will be explained in greater detail in the following description. FIGS. 1-3 show three embodiments of the apparatus in accordance with the invention with respect to changing gears, and FIG. 4 is a section taken through a hydraulic apparatus for generating various pressures, which are transmitted to the actuation members for the frictionally engaged elements.

DESCRIPTION OF THE EXEMPLARY EMBODIMENTS

Figure 1:
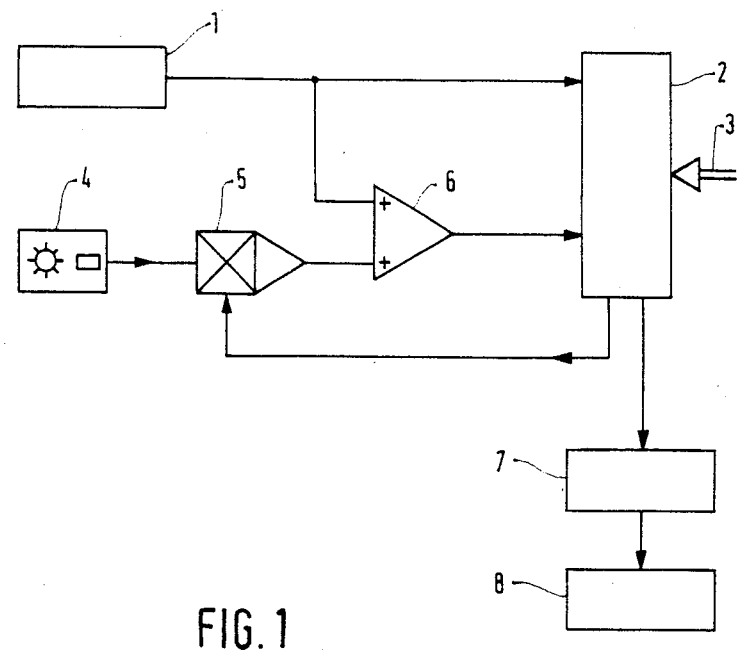

Automatically shiftable transmissions in motor vehicles include a hydrodynamic converter or clutch driven by an internal combustion engine of the vehicle, which is followed by at least two sets of planetary gears which can be selectively shifted by means of clutches or brakes into the flow of power between the engine and the output of the transmission or the driveshaft of the vehicle. In order to actuate these frictionally engaged elements which effect the shifting operation, that is, which shift some transmission elements out of the flow of power and others into it, actuation elements in the form of electromagnets are used, or more preferably hydraulic pistons. The effective power developed by these hydraulic pistons depends on the pressure in the line supplying them.

Let it be assumed that the engine torque (drive torque) is constant during the gear changing operation. The torque at the transmission output varies in proportion to the change in the gear ratio. The vehicle speed (output speed) can be assumed to vary practically not at all during the gear changing operation. At the beginning of an upshifting operation, the output torque drops sharply. The output torque then increases once again, because as a consequence of the changed gear ratio between the drive mechanism and the output, an additional torque has to be transmitted in order to attain the change in the spin of the rotating masses connected to the input of the transmission. The output torque then remains constant for a certain period of time, then drops at the end of the shifting operation—for instance, an upshifting operation into high gear—to the magnitude of the engine torque. The engine or transmission input speed begins to drop linearly at the instant that the output torque begins to rise, and at the end of the shifting operation it attains the output speed.

In the following description, the period during which the engine speed drops will be called the slippage time. The pressure for actuating the frictionally engaged elements such as clutches and brakes is determined by the fact that during the shifting operation, the engine torque (drive torque) and the torque for braking or accelerating the engine (upshifting with tractive effort or downshifting under engine braking conditions, respectively), which is determined by the rotary energy liberated by or required for changing the speed of the engine, must be transmitted by the frictionally engaged elements. The slippage time should be constant for every gear change, so that at high engine speed, greater pressure must be exerted than at low engine speed. The pressure at the frictionally engaged elements is therefore determined for $$p \sim M_{motor} + k \cdot n_{motor},$$

where M represents torque, n represents speed, and k is an empirically determined constant dependent on the particular gear change involved. This pressure at the frictionally engaged elements is adjusted for each instance of a gear change by means of the apparatus according to the invention, so that in each instance a correct adaptation of pressure is effected.

In FIG. 1, an apparatus for determining the engine torque 1 is connected with a transmission control unit 2. The transmission control unit 2 may be embodied hydraulically, digitally or in an analog form as in German Patent No. 20 40 918, for example, or it may be designed with a microprocessor as in German Disclosure Document DE-OS No. 29 38 268. As its input signals, it furthermore receives the other conventional input variables such as output speed, output torque, kickdown switch, position switch and the like. The output of an engine speed transducer 4 is connected with one input of a multiplier device 5. A further input of the multiplier device 5 is connected to the transmission control unit 2, which furnishes the constant factor k. The output of the multiplier device 5 leads to a summing device 6, the further input of which summing device is connected with the output of the engine torque apparatus 1. The output of the summing device 6 is connected with the transmission control unit 2. One output of the transmission control unit 2 leads to a pressure regulator 7, which triggers the frictionally engaged elements 8.

The signal which is emitted by the engine speed transducer 4 is multiplied in the multipler device 5 by the signal corresponding to the factor k and delivered to the summing device 6. The factor k is determined anew by the transmission control unit 2 depending on the gear change and then emitted. In the summing device 6, the signal dependent on engine torque is also added to the output of the multiplier device 5 and delivered to the transmission control unit 2. In accordance with the signal, the transmission control unit 2 triggers the pressure regulator 7, which furnishes the corresponding pressure for actuating the frictionally engaged elements 8.

Figure 2:
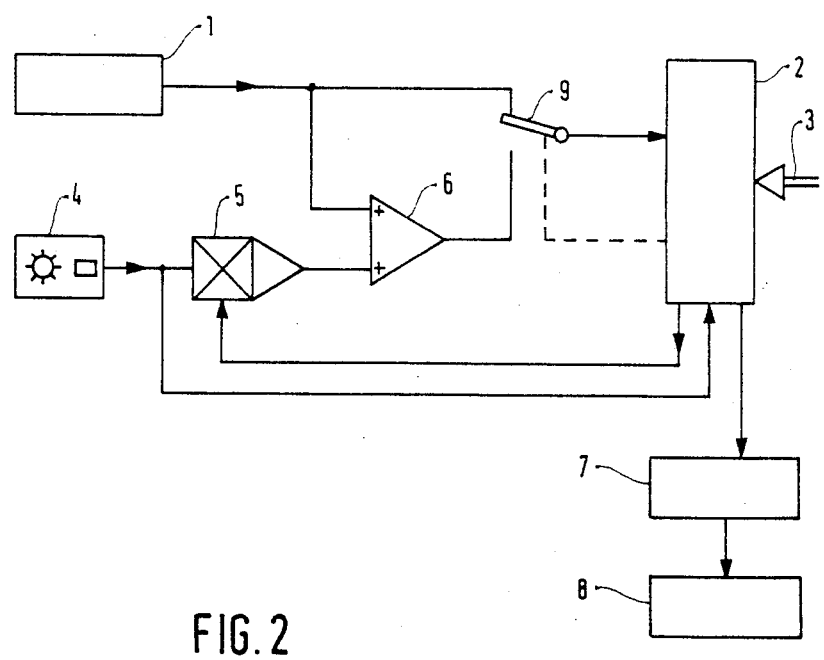

The exemplary embodiment shown in FIG. 2 differs from that shown in FIG. 1 in that the output of the speed transducer 4 is connected not only with the multiplier device 5 but also with the transmission control unit 2. Furthermore, in accordance with a switch 9, either the output of the device for determining the torque 1 or the output of the summing device 6 is connected to the transmission control unit 2. The switch 9 is controlled in accordance with a signal furnished by the transmission control unit 2.

At the beginning of the gear changing operation, the switch 9 is controlled by the transmission control unit 2 in such a manner that the output of the summing device 6 is connected with the transmission control unit 2. At the end of the gear changing operation, when the synchronous speed—that is, in high gear the output speed—is attained, the switch 9 connects the output of the device for determining the engine torque 1 with the transmission control unit 2, and the unmultiplied engine torque is used for effecting the pressure adaptation. In order to obtain the precise instant of the change in drive torque (engine torque) at the beginning of the gear change, the signal which is dependent on engine speed is delivered to the transmission control unit 2, differentiated there, and utilized for effecting the control of the switch 9.

Figure 3:
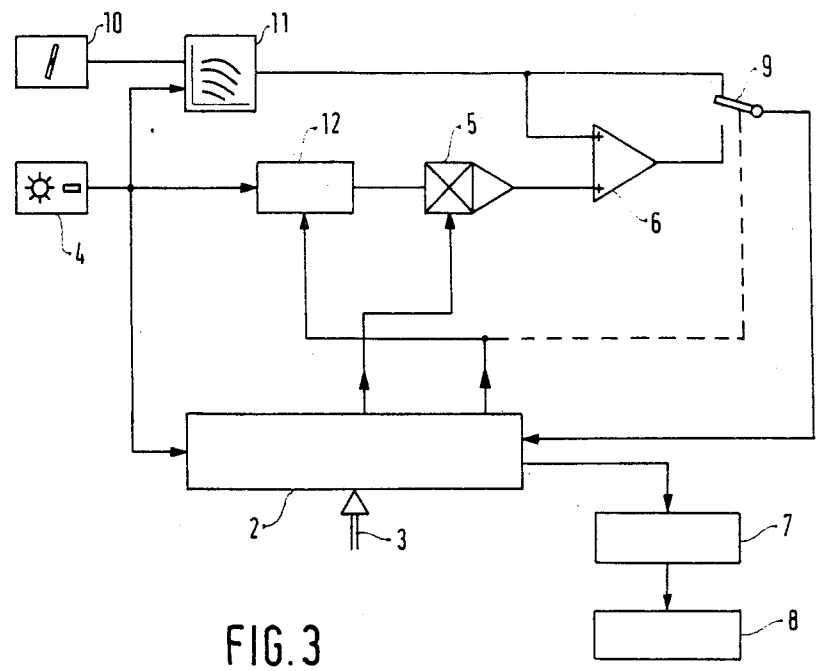

In FIG. 3, a further exemplary embodiment is shown; elements having the same function as those in FIGS. 1 and 2 also have the same reference numerals. The transmission control unit 2 in this embodiment is intended to be a computer device. A device for determining the engine load 10 is connected with a fixed-value memory 11, the output of which is connected on the one hand to the summing device 6 and on the other hand, via the switch 9, to the transmission control unit 2. The output of the speed transducer 4 is connected to the fixed-value memory 11, to a memory device which is embodied as a sample-and-hold circuit 12, and to the transmission control unit 2. The output of the sample-and-hold circuit 12 leads to the multiplier device 5. The sample-and-hold circuit 12 is triggered by the output of the transmission control unit 2, which contains the signal for the instant of gear changing.

The device for determining the engine load 10 can ascertain the load status by way of the position of the throttle valve, the intake pressure or by way of an air flow rate meter. The family of curves for the engine is stored in the fixed-value memory 11, and from this family of curves the actual engine torque can be determined with the aid of the engine speed. The signal dependent on the engine speed, which is furnished by the speed transducer 4, is written continuously into the sample-and-hold circuit 12. At the beginning of the gear changing operation, a signal is emitted from the transmission control unit 2 to the hold input, by means of which signal the instantaneous speed-dependent value is retained. Corresponding to the exemplary embodiments of FIGS. 1 and 2, this value is multiplied by the factor k in the multiplier device 5 and then added to the signal dependent on torque. The result is the variable which determines the pressure for the frictionally engaged elements 8. At the end of the gear changing operation, the sample-and-hold circuit 12 is reset; the speed-dependent value at that time is written in again, and the switch 9 is switched into the position which connects the output of the fixed-value memory 11 having the signal dependent on engine torque with the transmission control unit 2.

Figure 4:
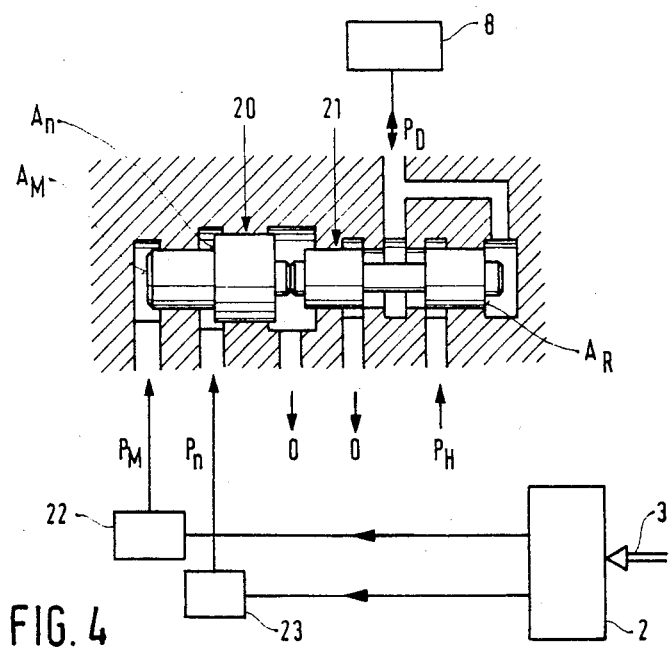

FIG. 4 shows the hydraulic apparatus for generating the pressure in accordance with the method of the invention. The apparatus includes a stepped slide valve 20 and a regulating slide valve 21, with two pressure regulators 22, 23 preceding the stepped slide valve 20. The pressure regulators 22, 23 are triggered, respectively, by a signal dependent on engine torque and a signal dependent on engine speed, which are furnished via the transmission control unit 2. The pressure regulator 22 furnishes a pressure $p_M$ dependent on engine torque, which is exerted upon the surface area $A_M$, while the pressure regulator 23 furnishes a pressure $p_n$ dependent on engine speed, which is exerted upon the annular surface area $A_n$ of the stepped slide valve 20. The pressures $p_M$, $p_n$ exerted upon the surface areas $A_M$ and $A_n$ generate a force which would be capable of displacing the stepped slide valve 20 in the direction of the regulating slide valve 21. This is counteracted by a force which is generated by the throttle pressure $p_D$ acting upon the surface area $A_R$ of the regulating slide valve 21. The throttle pressure triggers the frictionally engaged elements 8. In accordance with the displacement of the regulating slide valve 21, its control edge opens or closes the primary pressure line having the pressure $p_H$, so that an equilibrium of forces can be established. If the surface areas $A_M$, $A_n$ and $A_R$ are equal to one another, then the throttle pressure is obtained as the sum of the pressures $p_M$ and $p_n$. If the surface areas are of different sizes, then the throttle pressure is the sum of the product of the ratio of the areas $A_M$ to $A_R$ times $p_M$ and the product of the ratio of the areas $A_n$ to $A_R$ times $p_n$. If the frictionally engaged elements 8 all have the same moment about their points of support, then the same stepped slide valve and regulating slide valve can be used for each frictionally engaged element. If the moment about the support points varies, then identical regulating slide valves 21 can be used, while the stepped slide valve 20 is adapted variously to the various support moments via the surface areas $A_M$ and $A_n$.

An approximately constant component for all operating instances, which may be represented for example by the charge pressure in the clutches, may be taken into consideration by inserting a compression spring on the side of the stepped slide valve 20.

In the present case, the input variables 3 of the transmission control unit 2 also include the signals for the engine speed, which can be furnished by a speed transducer, and for the engine load, which can be determined from the injection quantity, the throttle valve position, the gas pedal position, or the underpressure in the intake tube.

The pressure regulators 22, 23, which convert the signals dependent on speed or engine torque directly into a corresponding pressure, can also be replaced by magnetic valves. In contrast to the pressure regulator, a 3/2-way magnetic valve requires a signal of modulated pulse length for determining pressure. A 3/3-way magnetic valve or the combination of a 3/2- and 2/2-way magnetic valve is likewise triggered in clocked fashion, but in its locking position it functions quasistatically and is to a great extent loss-free.

We claim:

1. A method for control of gear changing under load in a stepped gear hydraulic transmission of a motor vehicle driven by an engine, in which, to change gears, frictionally engaged elements (8) such as clutches or brakes are released or closed,
    wherein, in accordance with the invention, engine speed is changed during a gear shift for a period of time during which slippage of said frictionally engaged elements occurs,
    the length of said slippage time is held constant, regardless of the nature of the particular gear change being effected, and
    a hydraulic pressure upon the frictionally engaged elements (8) is selected to be proportional to the sum of an engine torque and the product of the engine speed and a constant factor, the constant factor being dependent on the slippage time and the nature of the gear change.

2. An apparatus, for regulation of hydraulic pressure in an automatic transmission during gear changing under load in a motor vehicle, driven by an engine, in which, to change gears, frictionally engaged elements (8) are released or closed under the influence of said hydraulic pressure, having
    a transmission control unit (2), which generates a constant factor signal which is a function of the nature of the particular gear change being effected, and triggers adjusting elements (7) for actuating the frictionally engaged elements (8), and
    a device (1) for determining an engine torque and generating an engine torque signal which is delivered to the transmission control unit (2),
    wherein, in accordance with the invention,
    an engine speed transducer (4) is provided, and generates an engine speed output signal,
    a multiplier device (5) is provided, which multiplies said engine speed output signal by the signal generated by the transmission control unit (2) and corresponding to the constant factor,
    a summing device (6) is provided for adding the output signal of the multiplier device (5) to the engine torque signal,
    and
    the transmission control unit (2) triggers the adjusting elements (7) in accordance with the output signal of the summing device, thereby permitting slippage of said frictionally engaged elements (8) for a constant period of time, regardless of the nature of the particular gear change being effected.

3. An apparatus as defined by claim 2, characterized in that a selector switch (9) is provided, which at the beginning of the gear changing operation connects the output of the summing device (6) to the transmission control unit (2) and at the end of the gear changing operation connects the output of the device for determining the engine torque (1) to the transmission control unit (2), which triggers the adjusting members (7) in accordance with the signal at a given time.

4. An apparatus as defined by claim 3, characterized in that the engine speed transducer (4) is connected with the transmission control unit (2), which controls the selector switch (9) in accordance with the engine speed signal.

5. An apparatus as defined by one of the claims 2–4, characterized in that during the gear changing operation, the input signal of the multiplier device (5), which is dependent on the engine speed, is kept constant.

6. An apparatus as defined by claim 5, characterized in that a memory device (12) is provided, which stores the engine speed signal at the beginning of the gear changing operation and during the gear changing operation, delivers this stored signal to the multiplier device (5).

7. An apparatus in accordance with claim 2,
    wherein, in accordance with the invention,
    the adjusting elements are configured as pressure regulators (22, 23) and as stepped slide valves (20), having stepped surface areas, exerting a force upon a regulating slide valve (21), the stepped surface areas ($A_M$, $A_n$) of the stepped slide valve (20) being acted upon by a pressure ($P_n$, $P_M$) dependent upon engine speed and engine torque and regulatable by the pressure regulators (22,23).

8. An apparatus as defined by claim 7, characterized in that the frictionally engaged elements are identical, to each other, two pressure regulators (22, 23), one stepped slide valve (20) and one regulating slide valve are provided.

9. An apparatus as defined by claim 7, wherein
    the frictionally engaged elements (7) are not identical,
    said frictionally engaged elements (8) each have respective support points,
    two pressure regulators (22, 23) and a plurality of stepped and regulating slide valves (20,21) are provided,
    and wherein the stepped surface areas of the stepped slide valve (20) are configured in accordance with moments, about the support points, of the frictionally engaged elements (8);
    and
    the regulating slide valves (21) are all identical to each other.

* * * * *